(12) United States Patent
Jiang et al.

(10) Patent No.: US 11,653,227 B2
(45) Date of Patent: May 16, 2023

(54) METHOD OF CONTROLLING RADIO RESOURCE MANAGEMENT MEASUREMENT OF NEIGHBORING CELL, MOBILE COMMUNICATION TERMINAL, AND NETWORK SIDE DEVICE

(71) Applicant: VIVO MOBILE COMMUNICATION CO., LTD., Chang'an Dongguan (CN)

(72) Inventors: Lei Jiang, Chang'an Dongguan (CN); Xueming Pan, Chang'an Dongguan (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 35 days.

(21) Appl. No.: 16/757,309

(22) PCT Filed: Oct. 11, 2018

(86) PCT No.: PCT/CN2018/109813
§ 371 (c)(1),
(2) Date: Apr. 17, 2020

(87) PCT Pub. No.: WO2019/095901
PCT Pub. Date: May 23, 2019

(65) Prior Publication Data
US 2021/0127279 A1    Apr. 29, 2021

(30) Foreign Application Priority Data

Nov. 15, 2017 (CN) .......................... 201711128092.1

(51) Int. Cl.
*H04W 24/02* (2009.01)
*H04W 72/12* (2023.01)

(52) U.S. Cl.
CPC ........... *H04W 24/02* (2013.01); *H04W 72/12* (2013.01)

(58) Field of Classification Search
CPC .............................. H04W 24/02; H04W 72/12
See application file for complete search history.

(56) References Cited

U.S. PATENT DOCUMENTS

| | | | | |
|---|---|---|---|---|
| 10,477,457 | B2 * | 11/2019 | Park | ..................... H04L 5/1469 |
| 2014/0086082 | A1 * | 3/2014 | Kim | ..................... H04B 17/345 |
| | | | | 370/252 |

(Continued)

FOREIGN PATENT DOCUMENTS

| | | |
|---|---|---|
| CN | 103052087 A | 4/2013 |
| KR | 20160094337 A | 8/2016 |
| WO | 2016056802 A1 | 4/2016 |

OTHER PUBLICATIONS

Extended European Search Report for related Application No. 18877589.4; reported on Oct. 23, 2020.

(Continued)

*Primary Examiner* — Rhonda L Murphy
(74) *Attorney, Agent, or Firm* — von Briesen & Roper, s.c.

(57) ABSTRACT

A method of controlling radio resource management (RRM) measurement of a neighboring cell, a mobile communication terminal, and a network side device are provided. The method includes: receiving RRM measurement configuration information for a neighboring cell and resource configuration information configured for a mobile communication terminal from a network side device; and when a conflict occurs between the RRM measurement configuration information and the resource configuration information, determining, according to a conflict resolution manner, whether to perform neighboring cell RRM measurement on a target resource where the conflict occurs.

20 Claims, 3 Drawing Sheets

(56) References Cited

U.S. PATENT DOCUMENTS

2016/0057642 A1     2/2016   Zhang et al.
2017/0332267 A1    11/2017   Kim et al.

OTHER PUBLICATIONS

NTT Docomo, Inc, "Discussion on remaining details on measurement for mobility managment", Oct. 9-13, 2017, 3GPP TSG RAN WG1 Meeting #90bis, Prague, CZ.
Vivo, "Remaining issues for RRM", Nov. 27-Dec. 1, 2017, 3GPP TSG RAN WG1 Meeting 91, Reno, US.
International Search Report & Written Opinion related to Application No. PCT/CN2018/109813; reported on Jan. 9, 2019.

\* cited by examiner

METHOD OF CONTROLLING RADIO RESOURCE MANAGEMENT MEASUREMENT OF NEIGHBORING CELL, MOBILE COMMUNICATION TERMINAL, AND NETWORK SIDE DEVICE

CROSS-REFERENCE TO RELATED APPLICATION

This application is a U.S. national phase application of a PCT Application No. PCT/CN2018/109813 filed on Oct. 11, 2018, which claims a priority to Chinese Patent Application No. 201711128092.1 filed in China on Nov. 15, 2017, a disclosure of which is incorporated in its entirety by reference herein.

TECHNICAL FIELD

The present disclosure relates to the field of communication technology, in particular to a method of controlling radio resource management (RRM) measurement of a neighboring cell, a mobile communication terminal, and a network side device.

BACKGROUND

In a communication system in the related art, a network side device may perform semi-static downlink (DL)/uplink (UL) configuration for a mobile communication terminal by using cell-specific higher layer signaling, or may perform semi-static DL/UL configuration for a mobile communication terminal by using user equipment (UE)-specific higher layer signaling. In addition, the network side device may use a dynamic slot format indicator (SFI) transmitted via a group-common physical downlink control channel (PDCCH) to perform dynamic DL/UL configuration for the mobile communication terminal. Each DL/UL configuration includes a plurality of DL transmission resources (DL slots/symbols), unknown transmission resources (unknown slots/symbols), and UL transmission resources (UL slots/symbols).

Generally, a mobile communication terminal may perform an RRM measurement of a neighboring cell on DL slots/symbols of a serving cell. When a conflict occurs between a neighboring cell RRM measurement configuration and a UL or unknown transmission resource configuration of a serving cell, a behavior of the mobile communication terminal is unclear because no definition of the behavior has been made explicitly. Thus, it is urgently necessary to provide a method of controlling RRM measurement of a neighboring cell, to resolve the problem that the conflict occurs between the RRM measurement configuration and the UL or unknown transmission resource configuration of the serving cell.

SUMMARY

In a first aspect, the present disclosure provides in some embodiments a method of controlling RRM measurement of a neighboring cell, which is applied to a mobile communication terminal. The method includes: receiving RRM measurement configuration information for a neighboring cell and resource configuration information configured for the mobile communication terminal from a network side device; and when a conflict occurs between the RRM measurement configuration information and the resource configuration information, determining, according to a conflict resolution manner, whether to perform neighboring cell RRM measurement on a target resource where the conflict occurs.

In a second aspect, the present disclosure further provides in some embodiments a method of controlling RRM measurement of a neighboring cell, which is applied to a network side device. The method includes: transmitting RRM measurement configuration information for a neighboring cell, resource configuration information configured for a mobile communication terminal, and a conflict resolution manner to the mobile communication terminal, where the conflict resolution manner is used to indicate whether the mobile communication terminal performs neighboring cell RRM measurement on a target resource, and the target resource is a resource where a conflict occurs between the measurement configuration information and the resource configuration information.

In a third aspect, the present disclosure further provides in some embodiments a mobile communication terminal, including: a receiving module, configured to receive RRM measurement configuration information for a neighboring cell and resource configuration information configured for the mobile communication terminal from a network side device; and a processing module, configured to: when a conflict occurs between the RRM measurement configuration information and the resource configuration information, determine, according to a conflict resolution manner, whether to perform neighboring cell RRM measurement on a target resource where the conflict occurs.

In a fourth aspect, the present disclosure further provides in some embodiments a network side device, including: a transmission module, configured to transmit RRM measurement configuration information for a neighboring cell, resource configuration information configured for a mobile communication terminal, and a conflict resolution manner to the mobile communication terminal, where the conflict resolution manner is used to indicate whether the mobile communication terminal performs neighboring cell RRM measurement on a target resource, and the target resource is a resource where a conflict occurs between the measurement configuration information and the resource configuration information.

In a fifth aspect, the present disclosure further provides in some embodiments a mobile communication terminal, including a processor, a storage, and a computer program stored in the storage and configured to be executed by the processor, where the processor is configured to execute the computer program to implement the steps in the foregoing method of controlling RRM measurement of a neighboring cell.

In a sixth aspect, the present disclosure further provides in some embodiments a network side device, including a processor, a storage, and a computer program stored in the storage and configured to be executed by the processor, where the processor is configured to execute the computer program to implement the steps in the foregoing method of controlling RRM measurement of a neighboring cell.

In a seventh aspect, the present disclosure further provides in some embodiments a computer-readable storage medium storing therein a computer program, where the computer program is configured to be executed by a processor, to implement the steps in the foregoing method of controlling RRM measurement of a neighboring cell.

BRIEF DESCRIPTION OF THE DRAWINGS

To describe the technical solutions in the embodiments of the present disclosure more clearly, the accompanying drawings required for describing the embodiments of the present disclosure are briefly described hereinafter. Apparently, the drawings accompanying the following descriptions show only some embodiments of the present disclosure, and a person of ordinary skill in the art may still derive other drawings from these accompanying drawings without creative efforts.

DETAILED DESCRIPTION

The technical solutions in the embodiments of the present disclosure are clearly and thoroughly described below with reference to the accompanying drawings of the embodiments of the present disclosure. Apparently, the described embodiments are some embodiments of the present disclosure, but are not all the embodiments. Based on the embodiments of the present disclosure, all other embodiments derived by a person of ordinary skill in the art without creative efforts shall fall within the scope of the present disclosure.

Figure 1:
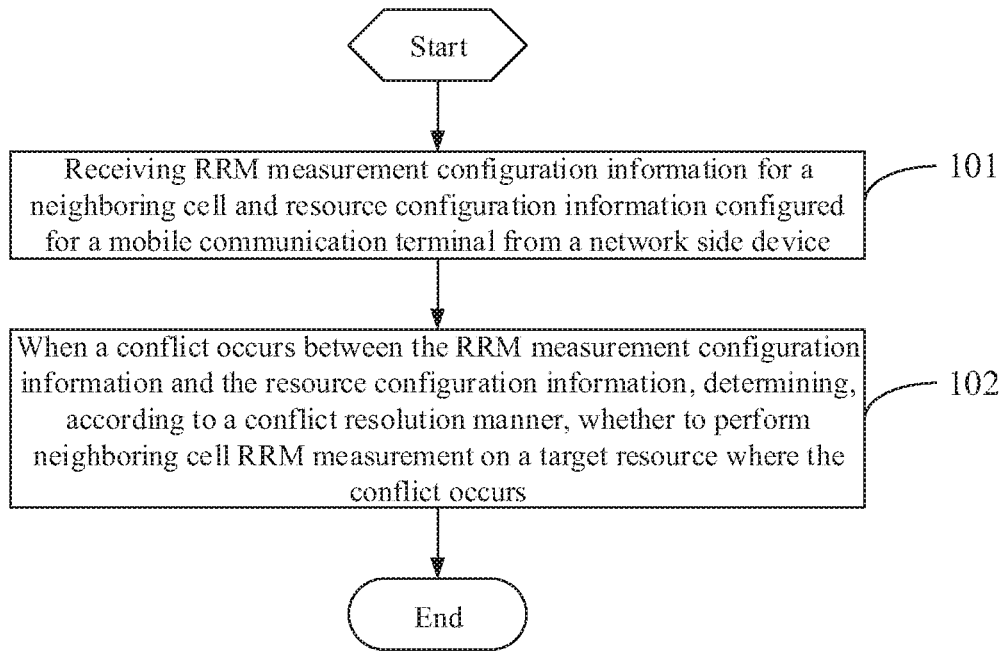
FIG. 1 is a flowchart of a method of controlling RRM measurement of a neighboring cell according to an embodiment of the present disclosure.

Referring to FIG. 1, FIG. 1 is a flowchart of a method of controlling RRM measurement of a neighboring cell according to an embodiment of the present disclosure. As shown in FIG. 1, the method includes the following steps.

A step 101 includes: receiving RRM measurement configuration information for a neighboring cell and resource configuration information configured for a mobile communication terminal from a network side device.

The method of controlling RRM measurement of a neighboring cell according to the embodiment of the present disclosure is mainly applied to the mobile communication terminal and is used to manage RRM measurement of a neighboring cell in the mobile communication terminal.

In the step, the network side device may configure for each mobile communication terminal connected to the network side device the RRM measurement configuration information for a neighboring cell and the resource configuration information, and transmit the RRM measurement configuration information and the resource configuration information to the corresponding mobile communication terminal. The RRM measurement configuration information and the resource configuration information may be transmitted to the mobile communication terminal by using the same signaling or may be transmitted to the mobile communication terminal by using different signaling. In addition, the RRM measurement configuration information and the resource configuration information may be transmitted at different moments. Each mobile communication terminal may receive the RRM measurement configuration information and the resource configuration information from the network side device.

A step 102 includes: when a conflict occurs between the RRM measurement configuration information and the resource configuration information, determining, according to a conflict resolution manner, whether to perform neighboring cell RRM measurement on a target resource where the conflict occurs.

In the step, that a conflict occurs between the RRM measurement configuration information and the resource configuration information refers to that there is an overlap between resources configured by the neighboring cell RRM measurement configuration information and resources configured by the resource configuration information.

The conflict resolution manner may be pre-defined in a protocol or may be indicated by the network side device, which is not further limited herein. That is, when the conflict occurs between the RRM measurement configuration information and the resource configuration information, the behavior of the mobile communication terminal may be determined according to a conflict resolution manner indicated by the network side device, or the behavior of the mobile communication terminal may be determined by the mobile communication terminal itself according to a conflict resolution manner defined in the protocol.

The specific content of the conflict resolution manner may be set according to an actual requirement. Whether to perform neighboring cell RRM measurement on the target resource, determined by the mobile communication terminal according to the conflict resolution manner, may take various forms. For example, when the mobile communication terminal determines not to perform neighboring cell RRM measurement on the target resource, current neighboring cell RRM measurement may be performed for the mobile communication terminal, but the current neighboring cell RRM measurement is not performed on the target resource; or the current neighboring cell RRM measurement may be not performed for the mobile communication terminal. When the mobile communication terminal determines to perform neighboring cell RRM measurement on the target resource, the current neighboring cell measurement may be performed for the mobile communication terminal.

In this way, in the embodiment of the present disclosure, neighboring cell RRM measurement configuration information and resource configuration information configured for a mobile communication terminal are received from a network side device; and when a conflict occurs between the RRM measurement configuration information and the resource configuration information, it is determined, according to a conflict resolution manner, whether to perform neighboring cell RRM measurement on a target resource where the conflict occurs. Because a conflict resolution manner is configured in a mobile communication terminal, when a conflict occurs between neighboring cell RRM measurement configuration information and resource configuration information, the mobile communication terminal may determine, according to the conflict resolution manner, whether to perform neighboring cell RRM measurement, such that the behavior of the mobile communication terminal is specified clearly, thereby resolving a problem that a conflict occurs between a neighboring cell RRM measurement configuration and a UL transmission resource configuration or an unknown resource configuration of a serving cell.

It should be understood that the content of the target resource may be set according to an actual requirement. For example, in this embodiment, the target resource may include: a semi-statically scheduled UL transmission resource and/or unknown transmission resource by using cell-specific higher layer signaling; or a semi-statically scheduled UL transmission resource and/or unknown transmission resource by using UE-specific higher layer signaling; or a UL transmission resource and/or an unknown transmission resource by using a dynamic SFI.

It is noted that, in other embodiments, the resource configuration information may include other resource configurations, for example, may include other UL transmission resource, a DL transmission resource or the like, which are not enumerated herein.

Specifically, the specific content of the conflict resolution manner may be set according to an actual requirement. For example, in this embodiment, the conflict resolution manner includes any one of the following three cases:

a first case: neighboring cell RRM measurement and/or data transmission is performed on the target resource according to a preset rule;

a second case: neighboring cell RRM measurement is not performed on the target resource;

a third case: the mobile communication terminal determines whether to perform neighboring cell RRM measurement or UL data transmission on the target resource where the conflict occurs.

In the embodiment, in the first manner, neighboring cell RRM measurement may be allowed on the target resource. Specifically, a condition for allowing the neighboring cell RRM measurement on the target resource is defined according to a preset rule, and the preset rule may be set according to an actual requirement. For example, in the embodiment, the preset rule may include the following.

1. When no UL data is scheduled on the target resource, neighboring cell RRM measurement is allowed on the target resource.

That no UL data is scheduled on the target resource encompasses two scenarios that there is no transmission scheduled on the target resource, and downlink data is scheduled on the target resource. For example, when the target resource is a semi-statically scheduled unknown transmission resource by using cell-specific higher layer signaling, or, the target resource is a semi-statically scheduled unknown transmission resource configured for the mobile communication terminal by using UE-specific higher layer signaling, or, the target resource is an unknown transmission resource configured for the mobile communication terminal by using a dynamic SFI, if there is no data scheduled on the target resource, neighboring cell RRM measurement is allowed on the target resource; and when the target resource is a semi-statically scheduled unknown transmission resource configured for the mobile communication terminal by using cell-specific higher layer signaling, or, the target resource is a semi-statically scheduled unknown transmission resource configured for the mobile communication terminal by using UE-specific higher layer signaling, or, the target resource is an unknown transmission resource configured for the mobile communication terminal by using a dynamic SFI, if there is no data scheduled on the target resource or scheduled data is downlink data, neighboring cell RRM measurement is allowed on the target resource.

2. When UL data is scheduled on the target resource and a capability of the mobile communication terminal does not support performing UL transmission and neighboring cell RRM measurement simultaneously, UL transmission is performed on the target resource or neighboring cell RRM measurement is performed on the target resource.

3. When UL data is scheduled on the target resource and a capability of the mobile communication terminal supports performing UL transmission and neighboring cell RRM measurement simultaneously, UL transmission is performed on the target resource and/or neighboring cell RRM measurement is performed on the target resource.

Different mobile communication terminals have different capabilities. When UL data is scheduled on the target resource, it may be determined, according to capability information of the mobile communication terminal, whether to perform neighboring cell RRM measurement on the target resource. Specifically, the mobile communication terminal supporting performing UL transmission and neighboring cell RRM measurement simultaneously includes: the mobile communication terminal may use different panels or radio frequency (RF) chains to perform reception and transmission simultaneously.

In the embodiment, when the mobile communication terminal supports performing UL transmission and neighboring cell RRM measurement simultaneously, UL transmission may be performed on the target resource, and neighboring cell RRM measurement on the target resource may be canceled, that is, a priority of UL transmission is higher than that of neighboring cell RRM measurement; or UL transmission on the target resource may be skipped, and neighboring cell RRM measurement may be performed on the target resource, that is, a priority of UL transmission is lower than that of neighboring cell RRM measurement; or different panels or RF chains may be used at the same time to perform UL transmission and neighboring cell RRM measurement simultaneously on the target resource.

When the mobile communication terminal does not support performing UL transmission and neighboring cell RRM measurement simultaneously, UL transmission may be performed on the target resource, and neighboring cell RRM measurement on the target resource may be canceled, that is, a priority of UL transmission is higher than that of neighboring cell RRM measurement; or UL transmission on the target resource may be skipped, and neighboring cell RRM measurement may be performed on the target resource, that is, a priority of UL transmission is lower than that of neighboring cell RRM measurement.

In the second manner, regardless of whether there is UL data scheduled in UL slots/symbols of a serving cell, the mobile communication terminal does not perform RRM measurement of any neighboring cell in these UL slots/symbols. That is, the directions of UL slots/symbols of the serving cell cannot be changed by a neighboring cell RRM measurement configuration, and the mobile communication terminal can perform transmission but cannot perform reception in these UL slots/symbols.

Optionally, regardless of whether there is data scheduled in unknown slots/symbols of a serving cell, the mobile communication terminal does not perform RRM measurement of any neighboring cell in these unknown slots/symbols. That is, the properties of unknown slots/symbols of the serving cell cannot be changed by a neighboring cell RRM measurement configuration, and a priority of unknown slots/symbols is higher than that of neighboring cell RRM measurement.

In the third manner, the mobile communication terminal needs to determine whether to perform neighboring cell RRM measurement or UL data transmission on the target resource where the conflict occurs. Specifically, the mobile communication terminal may determine, according to the capability information of the mobile communication terminal, a scheduling status of the target resource, and the like, whether to perform neighboring cell RRM measurement or UL data transmission.

Figure 2:
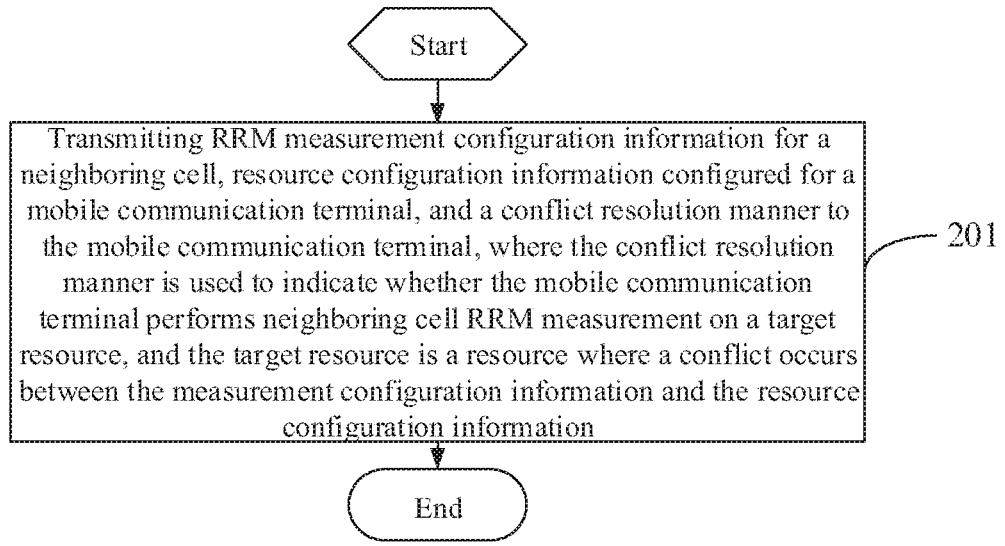
FIG. 2 is another flowchart of a method of controlling RRM measurement of a neighboring cell according to an embodiment of the present disclosure.

Further, referring to FIG. 2, the present disclosure further provides in some embodiments a method of controlling RRM measurement of a neighboring cell. As shown in FIG. 2, the method includes the following steps.

A step 201 includes: transmitting RRM measurement configuration information for a neighboring cell, resource configuration information configured for a mobile communication terminal, and a conflict resolution manner to the mobile communication terminal, where the conflict resolution manner is used to indicate whether the mobile communication terminal performs neighboring cell RRM measurement on a target resource, and the target resource is a resource where a conflict occurs between the measurement configuration information and the resource configuration information.

The method of controlling RRM measurement of a neighboring cell according to the embodiment of the present disclosure is mainly applied to the mobile communication terminal and is used to manage RRM measurement of a neighboring cell in the mobile communication terminal.

In the step, a network side device may configure for each mobile communication terminal connected to the network side device the neighboring cell RRM measurement configuration information and the resource configuration information configured for the mobile communication terminal, and transmit the neighboring cell RRM measurement configuration information and the resource configuration information configured for the mobile communication terminal to the corresponding mobile communication terminal. The neighboring cell RRM measurement configuration information and the resource configuration information configured for the mobile communication terminal may be transmitted to the mobile communication terminal by using the same signaling or may be transmitted to the mobile communication terminal by using different signaling. In addition, the neighboring cell RRM measurement configuration information and the resource configuration information configured for the mobile communication terminal may be transmitted at different moments. Each mobile communication terminal may receive the neighboring cell RRM measurement configuration information and the resource configuration information configured for the mobile communication terminal from the network side device.

That a conflict occurs between the RRM measurement configuration information and the resource configuration information refers to that there is an overlap between resources configured by the neighboring cell RRM measurement configuration information and resources configured by the resource configuration information.

When a conflict occurs between the RRM measurement configuration information and the resource configuration information, the mobile communication terminal may determine its behavior according to a conflict resolution manner defined in a protocol.

The specific content of the conflict resolution manner may be set according to an actual requirement. Whether to perform neighboring cell RRM measurement on the target resource, determined by the mobile communication terminal according to the conflict resolution manner, may take various forms. For example, when the mobile communication terminal determines not to perform neighboring cell RRM measurement on the target resource, current neighboring cell RRM measurement may be performed for the mobile communication terminal, but the current neighboring cell RRM measurement is not performed on the target resource; or the current neighboring cell RRM measurement may be not performed for the mobile communication terminal. When the mobile communication terminal determines to perform neighboring cell RRM measurement on the target resource, the current neighboring cell measurement may be performed for the mobile communication terminal.

In this way, in the embodiment of the present disclosure, because a network side device configures a conflict resolution manner for a mobile communication terminal, when a conflict occurs between the RRM measurement configuration information and the resource configuration information, the mobile communication terminal may determine, according to the conflict resolution manner, whether to perform neighboring cell RRM measurement, such that the behavior of the mobile communication terminal is specified clearly, thereby resolving a problem that a conflict occurs between a neighboring cell RRM measurement configuration and a UL transmission resource configuration or an unknown resource configuration of a serving cell.

It should be understood that the content of the target resource may be set according to an actual requirement. For example, in this embodiment, the target resource may include: a semi-statically scheduled UL transmission resource and/or unknown transmission resource configured for the mobile communication terminal by using cell-specific higher layer signaling; or a semi-statically scheduled UL transmission resource and/or unknown transmission resource configured for the mobile communication terminal by using UE-specific higher layer signaling; or a UL transmission resource and/or an unknown transmission resource configured for the mobile communication terminal by using a dynamic SFI.

It is noted that, in other embodiments, the resource configuration information may include other resource configurations, for example, may include other UL transmission resource, a DL transmission resource or the like, which are not enumerated herein.

Specifically, the specific content of the conflict resolution manner may be set according to an actual requirement. For example, in the embodiment, the conflict resolution manner includes any one of the following three cases:

a first case: neighboring cell RRM measurement and/or data transmission is performed on the target resource according to a preset rule;

a second case: neighboring cell RRM measurement is not performed on the target resource;

a third case: the mobile communication terminal determines whether to perform neighboring cell RRM measurement or UL data transmission on the target resource where the conflict occurs.

In the embodiment, in the first manner, neighboring cell RRM measurement may be allowed on the target resource. Specifically, a condition for allowing the neighboring cell RRM measurement on the target resource is defined according to a preset rule, and the preset rule may be set according to an actual requirement. For example, in the embodiment, the preset rule may include the following.

1. When no UL data is scheduled on the target resource, neighboring cell RRM measurement is allowed on the target resource.

That no UL data is scheduled on the target resource encompasses two scenarios that there is no transmission scheduled on the target resource, and downlink data is scheduled on the target resource. For example, when the target resource is a semi-statically scheduled unknown transmission resource configured for the mobile communication terminal by using cell-specific higher layer signaling, or, the target resource is a semi-statically scheduled unknown transmission resource configured for the mobile communication terminal by using UE-specific higher layer signaling, or, the target resource is an unknown transmission resource configured for the mobile communication terminal by using a dynamic SFI, if there is no data scheduled on the target resource, neighboring cell RRM measurement is allowed on the target resource; and when the target resource is a semi-statically scheduled unknown transmission resource configured for the mobile communication terminal by using cell-specific higher layer signaling, or, the target resource is a semi-statically scheduled unknown transmission resource configured for the mobile communication terminal by using UE-specific higher layer signaling, or, the target resource is an unknown transmission resource configured for the mobile communication terminal by using a dynamic SFI, if there is no data scheduled on the target resource or scheduled data is downlink data, neighboring cell RRM measurement is allowed on the target resource.

2. When UL data is scheduled on the target resource and a capability of the mobile communication terminal does not support performing UL transmission and neighboring cell RRM measurement simultaneously, UL transmission is performed on the target resource or neighboring cell RRM measurement is performed on the target resource.

3. When UL data is scheduled on the target resource and a capability of the mobile communication terminal supports performing UL transmission and neighboring cell RRM measurement simultaneously, UL transmission is performed on the target resource and/or neighboring cell RRM measurement is performed on the target resource.

Different mobile communication terminals have different capabilities. When UL data is scheduled on the target resource, it may be determined, according to capability information of the mobile communication terminal, whether to perform neighboring cell RRM measurement on the target resource. Specifically, the mobile communication terminal supporting performing UL transmission and neighboring cell RRM measurement simultaneously includes: the mobile communication terminal may use different panels or radio frequency (RF) chains to perform reception and transmission simultaneously.

In the embodiment, when the mobile communication terminal supports performing UL transmission and neighboring cell RRM measurement simultaneously, UL transmission may be performed on the target resource, and neighboring cell RRM measurement on the target resource may be canceled, that is, a priority of UL transmission is higher than that of neighboring cell RRM measurement; or UL transmission on the target resource may be skipped, and neighboring cell RRM measurement may be performed on the target resource, that is, a priority of UL transmission is lower than that of neighboring cell RRM measurement; or different panels or RF chains may be used at the same time to perform UL transmission and neighboring cell RRM measurement simultaneously on the target resource.

When the mobile communication terminal does not support performing UL transmission and neighboring cell RRM measurement simultaneously, UL transmission may be performed on the target resource, and neighboring cell RRM measurement on the target resource may be canceled, that is, a priority of UL transmission is higher than that of neighboring cell RRM measurement; or UL transmission on the target resource may be skipped, and neighboring cell RRM measurement may be performed on the target resource, that is, a priority of UL transmission is lower than that of neighboring cell RRM measurement.

In the second manner, regardless of whether there is UL data scheduled in UL slots/symbols of a serving cell, the mobile communication terminal does not perform RRM measurement of any neighboring cell in these UL slots/symbols. That is, the directions of UL slots/symbols of the serving cell cannot be changed by a neighboring cell RRM measurement configuration, and the mobile communication terminal can perform transmission but cannot perform reception in these UL slots/symbols.

Optionally, regardless of whether there is data scheduled in unknown slots/symbols of a serving cell, the mobile communication terminal does not perform RRM measurement of any neighboring cell in these unknown slots/symbols. That is, the properties of unknown slots/symbols of the serving cell cannot be changed by a neighboring cell RRM measurement configuration, and a priority of unknown slots/symbols is higher than that of neighboring cell RRM measurement.

In the third manner, the mobile communication terminal needs to determine whether to perform neighboring cell RRM measurement or UL data transmission on the target resource where the conflict occurs. Specifically, the mobile communication terminal may determine, according to the capability information of the mobile communication terminal, a scheduling status of the target resource, and the like, whether to perform neighboring cell RRM measurement or UL data transmission.

Figure 3:
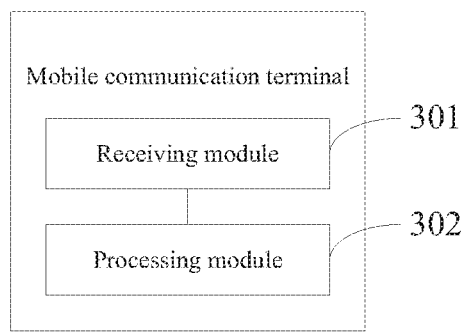
FIG. 3 is a structural diagram of a mobile communication terminal according to an embodiment of the present disclosure.

Referring to FIG. 3, FIG. 3 is a structural diagram of a mobile communication terminal according to an embodiment of the present disclosure. As shown in FIG. 3, the mobile communication terminal includes: a receiving module 301, configured to receive RRM measurement configuration information for a neighboring cell and resource configuration information configured for the mobile communication terminal from a network side device; and a processing module 302, configured to: when a conflict occurs between the RRM measurement configuration information and the resource configuration information, determine, according to a conflict resolution manner, whether to perform neighboring cell RRM measurement on a target resource where the conflict occurs.

Optionally, the conflict resolution manner is a conflict resolution manner transmitted by the network side device or a conflict resolution manner defined in a protocol.

Optionally, the conflict resolution manner includes any one of the following: performing neighboring cell RRM measurement and/or data transmission on the target resource according to a preset rule; forbidding neighboring cell RRM measurement on the target resource: determining, by the mobile communication terminal, whether to perform neighboring cell RRM measurement or UL data transmission on the target resource where the conflict occurs.

Optionally, the preset rule includes: when no UL data is scheduled on the target resource, allowing neighboring cell RRM measurement on the target resource; when UL data is scheduled on the target resource and a capability of the mobile communication terminal does not support performing UL transmission and neighboring cell RRM measurement simultaneously, performing UL transmission on the target resource or performing neighboring cell RRM measurement on the target resource; when UL data is scheduled on the target resource and a capability of the mobile communication terminal supports performing UL transmission and neighboring cell RRM measurement simultaneously, performing UL transmission on the target resource and/or performing neighboring cell RRM measurement on the target resource.

Optionally, that a capability of the mobile communication terminal supports performing UL transmission and neighboring cell RRM measurement simultaneously includes: the mobile communication terminal may use different panels or RF chains to perform reception and transmission simultaneously.

Optionally, the target resource includes: a semi-statically scheduled UL transmission resource and/or unknown transmission resource configured for the mobile communication terminal by using cell-specific higher layer signaling; or a semi-statically scheduled UL transmission resource and/or unknown transmission resource configured for the mobile communication terminal by using UE-specific higher layer signaling; or a UL transmission resource and/or an unknown transmission resource configured for the mobile communication terminal by using a dynamic SFI.

The mobile communication terminal in the embodiments of the present disclosure can implement various processes implemented by the mobile communication terminal in the method embodiment in FIG. 1. To avoid repetition, details are not described herein again.

Figure 4:
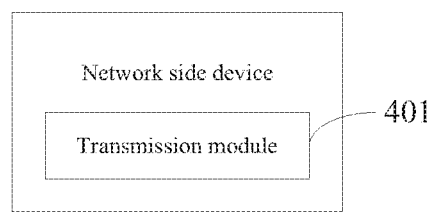
FIG. 4 is a structural diagram of a network side device according to an embodiment of the present disclosure.

Referring to FIG. 4, FIG. 4 is a structural diagram of a network side device according to an embodiment of the present disclosure. As shown in FIG. 4, the network side device includes: a transmission module 401, configured to transmit RRM measurement configuration information for a neighboring cell, resource configuration information configured for a mobile communication terminal, and a conflict resolution manner to the mobile communication terminal, where the conflict resolution manner is used to indicate whether the mobile communication terminal performs neighboring cell RRM measurement on a target resource, and the target resource is a resource where a conflict occurs between the measurement configuration information and the resource configuration information.

Optionally, the conflict resolution manner includes any one of the following: performing neighboring cell RRM measurement and/or data transmission on the target resource according to a preset rule; forbidding neighboring cell RRM measurement on the target resource; determining, by the mobile communication terminal, whether to perform neighboring cell RRM measurement or UL data transmission on the target resource where the conflict occurs.

Optionally, the preset rule includes: when no UL data is scheduled on the target resource, allowing neighboring cell RRM measurement on the target resource; when UL data is scheduled on the target resource and a capability of the mobile communication terminal does not support performing UL transmission and neighboring cell RRM measurement simultaneously, performing UL transmission on the target resource or performing neighboring cell RRM measurement on the target resource; when UL data is scheduled on the target resource and a capability of the mobile communication terminal supports performing UL transmission and neighboring cell RRM measurement simultaneously, performing UL transmission on the target resource and/or performing neighboring cell RRM measurement on the target resource.

Optionally, that a capability of the mobile communication terminal supports performing UL transmission and neighboring cell RRM measurement simultaneously includes: the mobile communication terminal may use different panels or RF chains to perform reception and transmission simultaneously.

Optionally, the target resource includes: a semi-statically scheduled UL transmission resource and/or unknown transmission resource configured for the mobile communication terminal by using cell-specific higher layer signaling; or a semi-statically scheduled UL transmission resource and/or unknown transmission resource configured for the mobile communication terminal by using UE-specific higher layer signaling; or a UL transmission resource and/or an unknown transmission resource configured for the mobile communication terminal by using a dynamic SFI.

The mobile communication terminal according to the embodiments of the present disclosure can implement various processes implemented by the mobile communication terminal in the method embodiment in FIG. 2. To avoid repetition, details are not described herein again.

Figure 5:
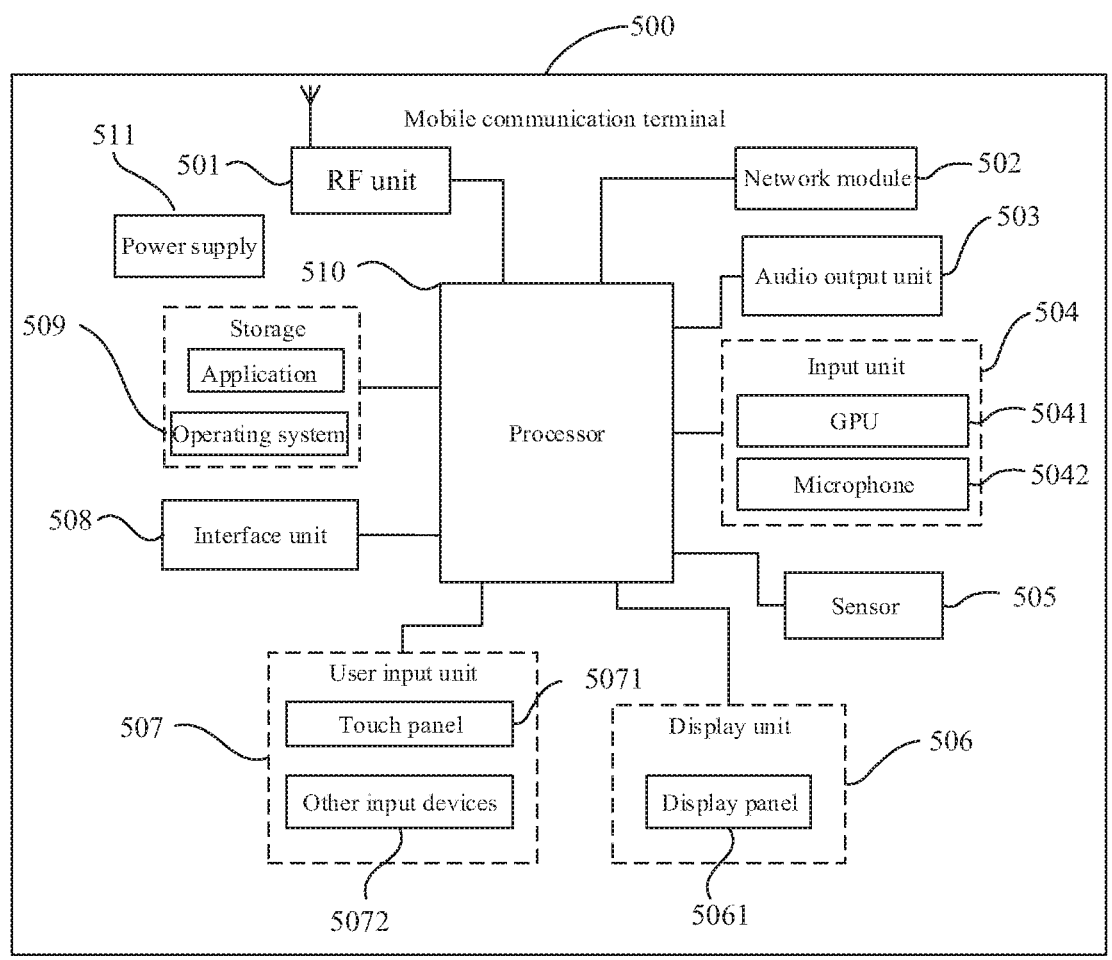
FIG. 5 is another structural diagram of a mobile communication terminal according to an embodiment of the present disclosure.

FIG. 5 is a schematic hardware structure diagram of a mobile terminal for implementing the embodiments of the present disclosure.

The mobile terminal (that is, a mobile communication terminal) 500 includes, but is not limited to, an RF unit 501, a network module 502, an audio output unit 503, an input unit 504, a sensor 505, a display unit 506, a user input unit 507, an interface unit 508, a storage 509, a processor 510, and a power supply 511, among other components. It may be understood by those skilled in the art that the mobile terminal structure shown in FIG. 5 does not constitute a limitation on the terminal, and the mobile terminal may include more or fewer components than those shown, or some components may be combined, or different component arrangements may be used. In the embodiments of the present disclosure, the mobile terminal includes, but is not limited to, a mobile phone, a tablet computer, a notebook computer, a palmtop computer, an in-vehicle terminal, a wearable device, a pedometer, etc.

The RF unit 501 is configured to receive RRM measurement configuration information for a neighboring cell and resource configuration information configured for the mobile communication terminal from a network side device.

The processor 510 is configured to: when a conflict occurs between the RRM measurement configuration information and the resource configuration information, determine, according to a conflict resolution manner, whether to perform neighboring cell RRM measurement on a target resource where the conflict occurs.

Optionally, the conflict resolution manner is a conflict resolution manner transmitted by the network side device or a conflict resolution manner defined in a protocol.

Optionally, the conflict resolution manner includes any one of the following: performing neighboring cell RRM measurement and/or data transmission on the target resource according to a preset rule; forbidding neighboring cell RRM measurement on the target resource; determining, by the mobile communication terminal, whether to perform neighboring cell RRM measurement or UL data transmission on the target resource where the conflict occurs.

Optionally, the preset rule includes: when no UL data is scheduled on the target resource, allowing neighboring cell RRM measurement on the target resource; when UL data is scheduled on the target resource and a capability of the mobile communication terminal does not support performing UL transmission and neighboring cell RRM measurement simultaneously, performing UL transmission on the target resource or performing neighboring cell RRM measurement on the target resource; when UL data is scheduled on the target resource and a capability of the mobile communication terminal supports performing UL transmission and neighboring cell RRM measurement simultaneously, performing UL transmission on the target resource and/or performing neighboring cell RRM measurement on the target resource.

Optionally, that a capability of the mobile communication terminal supports performing UL transmission and neighboring cell RRM measurement simultaneously includes: the mobile communication terminal may use different panels or RF chains to perform reception and transmission simultaneously.

Optionally, the target resource includes: a semi-statically scheduled UL transmission resource and/or unknown transmission resource configured for the mobile communication terminal by using cell-specific higher layer signaling; or a semi-statically scheduled UL transmission resource and/or unknown transmission resource configured for the mobile communication terminal by using UE-specific higher layer signaling; or a UL transmission resource and/or an unknown transmission resource configured for the mobile communication terminal by using a dynamic SF.

In this way, in the embodiment of the present disclosure, neighboring cell RRM measurement configuration information and resource configuration information configured for a mobile communication terminal are received from a network side device; and when a conflict occurs between the RRM measurement configuration information and the resource configuration information, it is determined, according to a conflict resolution manner, whether to perform neighboring cell RRM measurement on a target resource where the conflict occurs. Because a conflict resolution manner is configured in a mobile communication terminal, when a conflict occurs between neighboring cell RRM measurement configuration information and resource configuration information, the mobile communication terminal may determine, according to the conflict resolution manner, whether to perform neighboring cell RRM measurement, such that the behavior of the mobile communication terminal is specified clearly, thereby resolving a problem that a conflict occurs between a neighboring cell RRM measurement configuration and a UL transmission resource configuration or an unknown resource configuration of a serving cell.

It should be understood that in the embodiment of the present disclosure, the RF unit 501 may be configured to receive and transmit signals during receiving or transmitting information or a call. Specifically, the RF unit 501 may be configured to receive DL data from a base station to be processed by the processor 510, and additionally transmit UL data to the base station. Generally, the RF unit 501 includes, but is not limited to, an antenna, at least one amplifier, a transceiver, a coupler, a low noise amplifier, a duplexer, and the like. In addition, the RF unit 501 may also communicate with a network or other devices through a wireless communication system.

The mobile terminal provides a user with wireless broadband Internet access through the network module 502, for example, to enable the user to receive and send emails, browse web pages, access streaming media, and the like.

The audio output unit 503 may convert audio data received by the RF unit 501 or the network module 502 or stored in the storage 509 into an audio signal and output the audio signal as sound. Moreover, the audio output unit 503 may also provide audio output associated with a specific function performed by the mobile terminal 500 (for example, incoming call ringtone, message received ringtone and the like). The audio output unit 503 includes a speaker, a buzzer, a receiver, and the like.

The input unit 504 is configured to receive an audio or video signal. The input unit 504 may include a graphics processing unit (GPU) 5041 and a microphone 5042, and the GPU 5041 processes image data of a still picture or video obtained by an image capturing device (such as a camera) in a video capturing mode or an image capturing mode. Processed image frames can be displayed on the display unit 506. The image frames processed by the GPU 5041 may be stored in the storage 509 (or other storage medium) or transmitted via the RF unit 501 or the network module 502. The microphone 5042 can receive sound and can process such sound into audio data. In a telephone call mode, the processed audio data can be converted into an output format that can be transmitted to a mobile communication base station via the RF unit 501.

The mobile terminal 500 further includes at least one sensor 505 such as a light sensor, motion sensor, and other sensors. Specifically, the light sensor includes an ambient light sensor and a proximity sensor. The ambient light sensor can adjust the brightness of the display panel 5061 according to the intensity of ambient light, and the proximity sensor can turn off the display panel 5061 and/or backlight when the mobile terminal 500 is moved near the ear. As a kind of motion sensor, an accelerometer sensor can detect the magnitude of acceleration in various directions (usually three axes). When the accelerometer sensor is stationary, the accelerometer sensor can detect the magnitude and direction of gravity. The accelerometer sensor may be used in posture identification of the mobile terminal (e.g., switch between portrait and landscape modes, related games, magnetometer posture calibration), vibration identification related function (such as pedometer, tapping), and the like. The sensor 505 may further include a fingerprint sensor, a pressure sensor, an iris sensor, a molecular sensor, a gyroscope, a barometer, a hygrometer, a thermometer, an infrared sensor, and the like. Details are not described herein.

The display unit 506 is configured to display information input by the user or information provided to the user. The display unit 506 may include a display panel 5061. The display panel 5061 may be configured in the form of a liquid-crystal display (LCD), an organic light-emitting diode (OLED) or the like.

The user input unit 507 may be configured to receive input numeric or character information and to generate key signal inputs related to user settings and functional control of the mobile terminal. Specifically, the user input unit 507 includes a touch panel 5071 and other input devices 5072. The touch panel 5071, also referred to as a touch screen, can collect a touch operation (for example, an operation of the user on the touch panel 5071 or near the touch panel 5071 using a finger, a stylus or any appropriate object or accessory) of the user on or near the touch panel 5071. The touch panel 5071 may include two parts, namely, a touch detection device and a touch controller. The touch detection device detects the position touched by the user, detects a signal brought by the touch operation, and transmits the signal to the touch controller. The touch controller receives touch information from the touch detection device, converts the touch information into contact coordinates, and sends the contact coordinates to the processor 510. The touch controller receives commands from the processor 510 and executes the commands. In addition, the touch panel 5071 may be implemented in various forms such as resistive, capacitive, infrared, and surface acoustic wave. In addition to the touch panel 5071, the user input unit 507 may further include other input devices 5072. Specifically, other input devices 5072 may include, but are not limited to, a physical keyboard, functional keys (for example, a volume control button, and a switch button), a trackball, a mouse, and a joystick. Details are not described herein.

Further, the touch panel 5071 may be overlaid on the display panel 5061. When the touch panel 5071 detects a touch operation on or near the touch panel 5071, the touch panel 5071 transmits the detected signal to the processor 510 to determine the type of a touch event. The processor 510 then provides a corresponding visual output on the display panel 5061 according to the type of the touch event. Although in FIG. 5, the touch panel 5071 and the display panel 5061 are used as two independent components to implement the input and output functions of the mobile terminal, the touch panel 5071 and the display panel 5061 may be integrated to implement the input and output functions of the mobile terminal in some embodiments, which is not limited herein.

The interface unit 508 is an interface by which an external device is connected to the mobile terminal 500. For example, the external device may include a wired or wireless headset port, an external power (or battery charger) port, a wired or wireless data port, a memory card port, a port for connecting a device having an identification module, an audio input/output (I/O) port, a video I/O port, a headphone port, and the like. The interface unit 508 may be configured to receive input (for example, data information, and power) from the external device and transmit the received input to one or more components within the mobile terminal 500 or may be configured to transfer data between the mobile terminal 500 and the external device.

The storage 509 may be configured to store software programs as well as various data. The storage 509 may mainly include a program storage area and a data storage area. The program storage area may store an operating system, an application required for at least one function (for example, a sound playback function, and an image displaying function), and the like. The data storage area may store data (for example, audio data, and a phone book) created according to the use of a mobile phone. Moreover, the storage 509 may include a high-speed random access memory (RAM), and may further include a non-volatile storage, for example, at least one magnetic disk storage device, flash memory device, or other volatile solid state storage device.

The processor 510 is a control center of the mobile terminal, is connected to various portions of the entire mobile terminal using various interfaces and lines, and performs various functions of the mobile terminal and processes data by running or executing software programs and/or modules stored in the storage 509 and invoking data stored in the storage 509, so as to monitor the mobile terminal as a whole. The processor 510 may include one or more processing units. Optionally, the processor 510 may integrate an application processor and a modem. The application processor mainly processes an operating system, a user interface, an application, and the like. The modem mainly processes wireless communication. It may be understood that the modem may also not be integrated into the processor 510.

The mobile terminal 500 may further include a power supply 511 (for example, a battery) for powering various components. Optionally, the power supply 511 may be logically coupled to the processor 510 through a power management system, so as to implement charging management, discharging management, power consumption management, and other functions through the power management system.

In addition, the mobile terminal 500 includes some functional modules not shown, which are not described herein again.

Optionally, the present disclosure further provides in some embodiments a mobile terminal, including a processor 510, a storage 509, and a computer program stored in the storage 509 and executable on the processor 510. The computer program is configured to be executed by the processor 510 to implement various processes in the embodiments of the foregoing method of controlling RRM measurement of a neighboring cell, and can achieve the same technical effects. To avoid repetition, details are not described herein again.

The present disclosure further provides in some embodiments a computer-readable storage medium storing therein a computer program. The computer program is configured to be executed by a processor to implement various processes of the embodiments of the foregoing method of controlling RRM measurement of a neighboring cell, and can achieve the same technical effects. To avoid repetition, details are not described herein again. The computer-readable storage medium includes, for example, a read-only memory (ROM), a RAM, a magnetic disk, an optical disc or the like.

Figure 6:
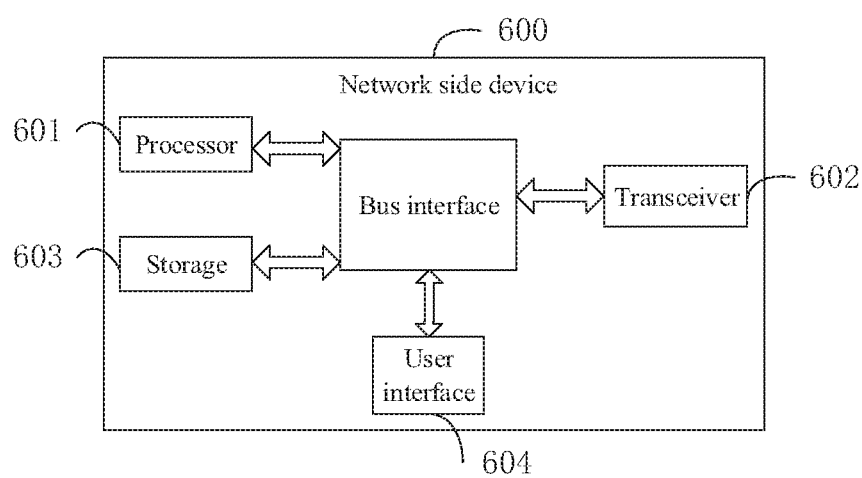
FIG. 6 is another structural diagram of a network side device according to an embodiment of the present disclosure.

Referring to FIG. 6, FIG. 6 is a structural diagram of a network side device according to an embodiment of the present disclosure, which can implement details of the method of controlling RRM measurement of a neighboring cell in the foregoing embodiments, and achieve the same effects. As shown in FIG. 6, a network side device 600 includes a processor 601, a transceiver 602, a storage 603, a user interface 604, and a bus interface.

The processor 601 is configured to read the program in the storage 603 to perform the following process: controlling the transceiver 602 to transmit neighboring cell RRM measurement configuration information, resource configuration information configured for a mobile communication terminal, and a conflict resolution manner to the mobile communication terminal, where the conflict resolution manner is used to indicate whether the mobile communication terminal performs neighboring cell RRM measurement on a target resource, and the target resource is a resource where a conflict occurs between the measurement configuration information and the resource configuration information.

In FIG. 6, a bus architecture may include any quantity of interconnected buses and bridges. Specifically, various circuits such as one or more processors represented by the processor 601 and a storage represented by the storage 603 are linked together. The bus architecture may also link various other circuits such as peripherals, voltage regulators, and power management circuits, which are well known in the art, and therefore are not further described herein. The bus interface provides an interface. The transceiver 602 may include a plurality of elements, that is, a transmitter and a receiver, to provide units for communicating with various other apparatuses over a transmission medium. For different user devices, the user interface 604 may be an interface capable of externally/internally connecting desired devices, including, but not limited to, a keypad, a display, a speaker, a microphone, and a joystick.

The processor 601 is responsible for managing the bus architecture and general processing. The storage 603 can store data used by the processor 601 while performing operations.

Optionally, the conflict resolution manner includes any one of the following: performing neighboring cell RRM measurement and/or data transmission on the target resource according to a preset rule; forbidding neighboring cell RRM measurement on the target resource; determining, by the mobile communication terminal, whether to perform neighboring cell RRM measurement or UL data transmission on the target resource where the conflict occurs.

Optionally, the preset rule includes: when no UL data is scheduled on the target resource, allowing neighboring cell RRM measurement on the target resource; when UL data is scheduled on the target resource and a capability of the mobile communication terminal does not support performing UL transmission and neighboring cell RRM measurement simultaneously, performing UL transmission on the target resource or performing neighboring cell RRM measurement on the target resource; when UL data is scheduled on the target resource and a capability of the mobile communication terminal supports performing UL transmission and neighboring cell RRM measurement simultaneously, performing UL transmission on the target resource and/or performing neighboring cell RRM measurement on the target resource.

Optionally, that a capability of the mobile communication terminal supports performing UL transmission and neighboring cell RRM measurement simultaneously includes: the mobile communication terminal may use different panels or RF chains to perform reception and transmission simultaneously.

Optionally, the target resource includes: a semi-statically scheduled UL transmission resource and/or unknown transmission resource configured for the mobile communication terminal by using cell-specific higher layer signaling; or a semi-statically scheduled UL transmission resource and/or unknown transmission resource configured for the mobile communication terminal by using UE-specific higher layer signaling; or a UL transmission resource and/or an unknown transmission resource configured for the mobile communication terminal by using a dynamic SF.

In this way, in the embodiment of the present disclosure, because a network side device configures a conflict resolution manner for a mobile communication terminal, when a conflict occurs between neighboring cell RRM measurement configuration information and resource configuration information, the mobile communication terminal may determine, according to the conflict resolution manner, whether to perform neighboring cell RRM measurement, such that the behavior of the mobile communication terminal is specified clearly, thereby resolving a problem that a conflict occurs between a neighboring cell RRM measurement configuration and a UL transmission resource configuration or an unknown resource configuration of a serving cell.

A person of ordinary skill in the art may be aware that, the exemplary units and algorithm steps described in combination with the embodiments disclosed herein may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present disclosure.

It may be clearly understood by a person skilled in the art that, for ease of description and conciseness, for a detailed working process of the foregoing system, apparatus, and unit, reference may be made to a corresponding process in the foregoing method embodiments, which are not described herein again.

In the embodiments provided in the present disclosure, it should be understood that the disclosed apparatus and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the shown or discussed mutual couplings or direct couplings or communication connections may be implemented through some interfaces, indirect couplings or communication connections between the apparatuses or units, and may be electrical connections, mechanical connections, or connections in other forms.

The units described as separate parts may or may not be physically separate, and parts shown as units may or may not be physical units, that is, may be located in one position, or may be distributed on a plurality of network units. Some or all of the units may be selected according to actual needs to achieve the objects of the solutions in the embodiments of the present disclosure.

In addition, functional units in the embodiments of the present disclosure may be integrated into one processing unit, or each of the units may exist alone physically, or two or more units are integrated into one unit.

When the functions are implemented in the form of a software functional unit and sold or used as an independent product, the software functional unit may be stored in a computer-readable storage medium. Based on such an understanding, an essential part or a part contributing to the related art of the technical solutions of the present disclosure or some of the technical solutions may be implemented in the form of a software product. The software product is stored in a storage medium and includes several instructions for instructing a computer device (which may be a personal computer, a server, a network device or the like) to perform all or some of the steps of the method described in the embodiments of the present disclosure. The storage medium includes various media that can store program code, such as a universal serial bus (USB) flash drive, a removable hard disk, a ROM, a RAM, a magnetic disk or an optical disc.

The foregoing descriptions are merely specific implementations of the present disclosure, but are not intended to limit the scope of the present disclosure. Any variation or replacement readily occurring to a person skilled in the art without departing from the technical scope disclosed in the present disclosure shall fall within the scope of the present disclosure. Therefore, the scope of the present disclosure is defined by the scope of the claims.

What is claimed is:

1. A method of controlling radio resource management (RRM) measurement of a neighboring cell, applied to a mobile communication terminal, comprising:
receiving RRM measurement configuration information for a neighboring cell and resource configuration information configured for the mobile communication terminal from a network side device; and
when a conflict occurs between a time-domain resource configured by the RRM measurement configuration information and a time-domain resource configured by the resource configuration information, and UL data is scheduled on a target time-domain resource where the conflict occurs, not requiring the mobile communication terminal to perform neighboring cell RRM measurement on the target time-domain resource.

2. The method according to claim 1, wherein the not requiring the mobile communication terminal to perform neighboring cell RRM measurement on the target time-domain resource comprises not performing neighboring cell RRM measurement on the target time-domain resource.

3. The method according to claim 1, further comprising:
when the conflict occurs between the time-domain resource configured by the RRM measurement configuration information and the time-domain resource configured by the resource configuration information, and no UL data is scheduled on the target time-domain resource, allowing neighboring cell RRM measurement on the target time-domain.

4. The method according to claim 1, wherein the not requiring the mobile communication terminal to perform neighboring cell RRM measurement on the target time-domain resource comprises:
when UL data is scheduled on the target time-domain resource and a capability of the mobile communication terminal does not support performing UL transmission and neighboring cell RRM measurement simultaneously, performing UL transmission on the target time-domain resource;
when UL data is scheduled on the target time-domain resource and a capability of the mobile communication terminal supports performing UL transmission and neighboring cell RRM measurement simultaneously, performing UL transmission on the target time-domain resource.

5. The method according to claim 4, wherein that a capability of the mobile communication terminal supports performing UL transmission and neighboring cell RRM measurement simultaneously comprises:
the mobile communication terminal supports using different panels or radio frequency (RF) chains to perform reception and transmission simultaneously.

6. The method according to claim 1, wherein the target time-domain comprises:
a semi-statically scheduled UL transmission time-domain resource and/or unknown transmission time-domain resource configured for the mobile communication terminal by using cell-specific higher layer signaling; or,
a semi-statically scheduled UL transmission time-domain resource and/or unknown transmission time-domain resource configured for the mobile communication terminal by using user equipment (UE)-specific higher layer signaling; or,
a UL transmission time-domain resource and/or an unknown transmission time-domain resource configured for the mobile communication terminal by using a dynamic slot format indicator (SFI).

7. The method according to claim 1, wherein the conflict refers to that the time-domain resource configured by the RRM measurement configuration information and the time-domain resource configured by the resource configuration information.

8. A mobile communication terminal, comprising a processor, a storage, and a computer program stored in the storage and configured to be executed by the processor, wherein the processor is configured to execute the computer program to implement the following steps:
receiving RRM measurement configuration information for a neighboring cell and resource configuration information configured for the mobile communication terminal from a network side device; and
when a conflict occurs between a time-domain resource configured by the RRM measurement configuration information and a time-domain resource configured by the resource configuration information, and UL data is scheduled on a target time-domain resource where the conflict occurs, not requiring the mobile communication terminal to perform neighboring cell RRM measurement on the target time-domain resource.

9. The mobile communication terminal according to claim 8, wherein the not requiring the mobile communication terminal to perform neighboring cell RRM measurement on the target time-domain resource comprises not performing neighboring cell RRM measurement on the target time-domain.

10. The mobile communication terminal according to claim 8, wherein the processor is configured to execute the computer program to further implement following step:
when the conflict occurs between the time-domain resource configured by the RRM measurement configuration information and the time-domain resource configured by the resource configuration information, and no UL data is scheduled on the target time-domain resource, allowing neighboring cell RRM measurement on the target time-domain resource.

11. The mobile communication terminal according to claim 8, wherein the not requiring the mobile communication terminal to perform neighboring cell RRM measurement on the target time-domain resource comprises:
when UL data is scheduled on the target time-domain resource and a capability of the mobile communication terminal does not support performing UL transmission and neighboring cell RRM measurement simultaneously, performing UL transmission on the target time-domain resource;
when UL data is scheduled on the target time-domain resource and a capability of the mobile communication terminal supports performing UL transmission and neighboring cell RRM measurement simultaneously, performing UL transmission on the target time-domain resource.

12. The mobile communication terminal according to claim 11, wherein that a capability of the mobile communication terminal supports performing UL transmission and neighboring cell RRM measurement simultaneously comprises:
the mobile communication terminal supports using different panels or radio frequency (RF) chains to perform reception and transmission simultaneously.

13. The mobile communication terminal according to claim 8, wherein the target time-domain resource comprises:
a semi-statically scheduled UL transmission time-domain resource and/or unknown transmission time-domain resource configured for the mobile communication terminal by using cell-specific higher layer signaling; or,
a semi-statically scheduled UL transmission time-domain resource and/or unknown transmission time-domain resource configured for the mobile communication terminal by using user equipment (UE)-specific higher layer signaling; or,
a UL transmission time-domain resource and/or an unknown transmission time-domain resource configured for the mobile communication terminal by using a dynamic slot format indicator (SFI).

14. The mobile communication terminal according to claim 8, wherein the conflict refers to that the time-domain resource configured by the RRM measurement configuration information and the time-domain resource configured by the resource configuration information overlap.

15. A non-transitory computer-readable storage medium storing therein a computer program, wherein the computer program is configured to be executed by a processor, to implement the following steps:
   receiving RRM measurement configuration information for a neighboring cell and resource configuration information configured for the mobile communication terminal from a network side device; and
   when a conflict occurs between a time-domain resource configured by the RRM measurement configuration information and a time-domain resource configured by the resource configuration information, and UL data is scheduled on a target time-domain resource where the conflict occurs, not requiring the mobile communication terminal to perform neighboring cell RRM measurement on the target time-domain resource.

16. The non-transitory computer-readable storage medium according to claim 15, wherein the not requiring the mobile communication terminal to perform neighboring cell RRM measurement on the target time-domain resource comprises not performing neighboring cell RRM measurement on the target time-domain resource.

17. The non-transitory computer-readable storage medium according to claim 15, wherein the computer program is configured to be executed by a processor, to further implement the following step:
   when the conflict occurs between the time-domain resource configured by the RRM measurement configuration information and the time-domain resource configured by the resource configuration information, and no UL data is scheduled on the target time-domain resource, allowing neighboring cell RRM measurement on the target time-domain resource.

18. The non transitory computer-readable storage medium according to claim 15, wherein the not requiring the mobile communication terminal to perform neighboring cell RRM measurement on the target time-domain resource comprises:
   when UL data is scheduled on the target time-domain resource and a capability of the mobile communication terminal does not support performing UL transmission and neighboring cell RRM measurement simultaneously, performing UL transmission on the target time-domain resource;
   when UL data is scheduled on the target time-domain resource and a capability of the mobile communication terminal supports performing LTL transmission and neighboring cell RRM measurement simultaneously, performing UL transmission on the target time-domain resource.

19. The non-transitory computer-readable storage medium according to claim 18, wherein that a capability of the mobile communication terminal supports performing UL transmission and neighboring cell RRM measurement simultaneously comprises:
   the mobile communication terminal supports using different panels or radio frequency (RF) chains to perform reception and transmission simultaneously.

20. The non-transitory computer-readable storage medium according to claim 15, wherein the target time-domain resource comprises;
   a semi-statically scheduled UL transmission time-domain resource and/or unknown transmission time-domain resource configured for the mobile communication terminal by using cell-specific higher layer signaling; or,
   a semi-statically scheduled UL transmission time-domain resource and/or unknown transmission time-domain resource configured for the mobile communication terminal by using user equipment (UFO-specific higher layer signaling; or,
   a UL transmission time-domain resource and/or an unknown transmission time-domain resource configured for the mobile communication terminal by using a dynamic slot format indicator (SFI).

\* \* \* \* \*